(12) United States Patent
Mattox et al.

(10) Patent No.: US 10,417,586 B2
(45) Date of Patent: Sep. 17, 2019

(54) ATTACHING OWNERSHIP TO DATA (75) Inventors: John R. Mattox, Raleigh, NC (US); Norman L. Faus, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 1171 days.

(21) Appl. No.: 11/849,240

(22) Filed: Aug. 31, 2007

(65) Prior Publication Data

US 2009/0063540 A1    Mar. 5, 2009

(51) Int. Cl.
*G06F 16/00*    (2019.01)
*G06Q 10/06*    (2012.01)
*G06F 16/40*    (2019.01)

(52) U.S. Cl.
CPC ............. *G06Q 10/06* (2013.01); *G06F 16/40* (2019.01)

(58) Field of Classification Search
CPC .......... G06F 16/10; G06F 16/11; G06F 16/16; G06F 16/20; G06F 16/21; G06F 16/22; G06F 16/86; G06F 16/93; G06F 16/122; G06F 16/248; G06F 16/285; G06F 16/288
USPC .......................... 707/736, 758, 781, 694, 769
See application file for complete search history.

(56) References Cited

U.S. PATENT DOCUMENTS

| | | | | |
|---|---|---|---|---|
| 5,799,191 A * | 8/1998 | Moriyasu | ............... | G06Q 10/10 709/204 |
| 6,449,617 B1 | 9/2002 | Quinn et al. | | |
| 7,076,567 B1 * | 7/2006 | Chasman | ............... | G06F 16/273 709/248 |
| 7,093,285 B2 * | 8/2006 | Singhani | ................ | G06Q 30/06 705/35 |
| 7,236,966 B1 * | 6/2007 | Jackson | .............. | G06F 16/9535 707/999.005 |
| 7,441,239 B2 * | 10/2008 | Bittner et al. | ................. | 718/100 |
| 7,519,575 B1 * | 4/2009 | Simpson | ................. | G06F 16/10 707/999.1 |
| 7,617,225 B2 * | 11/2009 | Arrouye | .................. | G06F 16/11 707/999.104 |
| 7,720,881 B2 * | 5/2010 | Rowley | ................... | G06F 16/10 707/803 |
| 7,725,500 B2 * | 5/2010 | Rowley | ................... | G06F 16/10 707/803 |
| 7,725,563 B2 * | 5/2010 | Rowley | ................... | G06F 16/10 709/219 |
| 7,725,564 B2 * | 5/2010 | Rowley | ............... | H04L 61/1552 707/774 |
| 7,756,945 B1 * | 7/2010 | Andreessen | .......... | G06F 16/289 709/217 |

(Continued)

OTHER PUBLICATIONS

Non-Final Office Action for U.S. Appl. No. 11/849,233 dated Jul. 23, 2010.

(Continued)

*Primary Examiner* — Ashish Thomas
*Assistant Examiner* — Rezwanul Mahmood
(74) *Attorney, Agent, or Firm* — Lowenstein Sandler LLP (57) ABSTRACT An embodiment pertains generally to a method of classifying information. The method includes providing for a data object and receiving ownership roles for the data object. The ownership roles establishes at least one user as associated with the data object and a relationship of the at least one user to the data object. The method also includes generating metadata comprising the ownership roles and outputting the metadata to be stored with the data object.

8 Claims, 7 Drawing Sheets

(56) References Cited

U.S. PATENT DOCUMENTS

| | | | |
|---|---|---|---|
| 7,774,433 B2* | 8/2010 | Rowley | G06F 16/10 709/219 |
| 7,827,615 B1* | 11/2010 | Allababidi | G06Q 10/10 726/1 |
| 7,926,030 B1* | 4/2011 | Harmon | G06F 9/44505 717/121 |
| 7,962,504 B1* | 6/2011 | Mehanna | G06F 16/245 707/765 |
| 7,966,369 B1* | 6/2011 | Briere | G06Q 10/10 709/204 |
| 8,000,992 B1* | 8/2011 | Marchbanks | G06Q 10/0631 705/7.27 |
| 8,166,404 B2* | 4/2012 | Grinstein | G06F 21/629 715/731 |
| 8,195,488 B1* | 6/2012 | Taix | G06Q 10/063 705/7.11 |
| 8,769,127 B2* | 7/2014 | Selimis | H04L 67/06 709/223 |
| 8,924,920 B2* | 12/2014 | Faus | G06F 8/61 717/104 |
| 2002/0161602 A1* | 10/2002 | Dougherty | G06Q 10/103 705/80 |
| 2002/0174010 A1* | 11/2002 | Rice, III | G06Q 30/02 705/14.67 |
| 2003/0037044 A1* | 2/2003 | Boreham | G06F 16/10 707/999.003 |
| 2003/0105733 A1* | 6/2003 | Boreham | G06F 16/10 707/999.001 |
| 2003/0115196 A1* | 6/2003 | Boreham | G06F 16/10 707/999.004 |
| 2004/0064552 A1* | 4/2004 | Chong | G06F 11/3006 709/224 |
| 2004/0078546 A1 | 4/2004 | Civlin | |
| 2004/0093558 A1 | 5/2004 | Weaver | |
| 2004/0215626 A1* | 10/2004 | Colossi | G06F 16/24542 707/999.1 |
| 2004/0260702 A1* | 12/2004 | Cragun et al. | 707/100 |
| 2005/0071871 A1* | 3/2005 | Yuzawa | H04N 5/44504 725/48 |
| 2005/0102297 A1* | 5/2005 | Lloyd | H04L 29/12132 707/999.1 |
| 2005/0108271 A1* | 5/2005 | Hurmiz | G06F 16/20 707/999.102 |
| 2006/0004709 A1* | 1/2006 | Borthakur | G06F 16/10 707/999.003 |
| 2006/0005036 A1* | 1/2006 | Hu | G06Q 40/02 713/182 |
| 2006/0010118 A1* | 1/2006 | Sattler | G06F 17/246 707/999.003 |
| 2006/0010125 A1* | 1/2006 | Beartusk | G06Q 10/10 707/999.004 |
| 2006/0047657 A1* | 3/2006 | Frieder | G06F 21/6218 707/999.009 |
| 2006/0122977 A1* | 6/2006 | Brodhun | G06F 16/288 707/999.003 |
| 2006/0212477 A1* | 9/2006 | Murphy | G06F 16/283 707/999.107 |
| 2006/0218159 A1* | 9/2006 | Murphy | G06F 16/283 707/999.1 |
| 2007/0005562 A1* | 1/2007 | Chau | G06F 16/288 707/999.002 |
| 2007/0011147 A1* | 1/2007 | Falkenberg | G06Q 10/10 707/999.003 |
| 2007/0033276 A1* | 2/2007 | Brockhoff | G06Q 10/06 709/224 |
| 2007/0050336 A1* | 3/2007 | Bugir | G06F 8/00 707/999.003 |
| 2007/0050366 A1* | 3/2007 | Bugir | G06Q 30/0603 707/999.009 |
| 2007/0050382 A1* | 3/2007 | Bugir | G06F 8/20 707/999.001 |
| 2007/0079247 A1* | 4/2007 | Carignan | G06F 3/0481 715/745 |
| 2007/0079384 A1* | 4/2007 | Grinstein | G06F 21/629 726/27 |
| 2007/0099161 A1* | 5/2007 | Krebs | G09B 5/00 434/322 |
| 2007/0106659 A1 | 5/2007 | Lu et al. | |
| 2007/0133064 A1 | 6/2007 | Itogawa et al. | |
| 2007/0136244 A1* | 6/2007 | MacLaurin | G06Q 10/10 707/999.003 |
| 2007/0136245 A1 | 6/2007 | Hess et al. | |
| 2007/0185835 A1 | 8/2007 | Ursitti et al. | |
| 2007/0198317 A1* | 8/2007 | Harthcryde | G06Q 10/00 705/7.14 |
| 2007/0208713 A1* | 9/2007 | Krishnaprasad | G06F 16/951 707/999.003 |
| 2007/0208744 A1* | 9/2007 | Krishnaprasad | G06F 21/6227 707/999.009 |
| 2007/0283443 A1* | 12/2007 | McPherson | G06F 21/6218 726/26 |
| 2008/0005161 A1* | 1/2008 | Grealish | H04L 41/0233 707/999.103 |
| 2008/0059897 A1* | 3/2008 | Dilorenzo | G06F 16/38 715/764 |
| 2008/0147610 A1* | 6/2008 | Mohanty | G06Q 10/00 707/999.003 |
| 2008/0155039 A1* | 6/2008 | Fernandes | G06Q 10/06 709/206 |
| 2008/0163239 A1* | 7/2008 | Sugumar | G06F 9/5088 718/105 |
| 2008/0168048 A1* | 7/2008 | Bell | G06F 16/951 707/999.005 |
| 2008/0208807 A1* | 8/2008 | Rowley | G06F 16/10 707/999.003 |
| 2008/0208809 A1* | 8/2008 | Rowley | G06F 16/10 707/999.003 |
| 2008/0208810 A1* | 8/2008 | Rowley | G06F 16/10 707/999.003 |
| 2008/0208811 A1* | 8/2008 | Rowley | G06F 16/10 707/999.003 |
| 2008/0208918 A1* | 8/2008 | Yang | G06F 16/283 707/999.2 |
| 2008/0228720 A1* | 9/2008 | Mukherjee | G06F 16/3338 707/999.003 |
| 2008/0243786 A1* | 10/2008 | Stading | G06F 16/93 707/999.003 |
| 2008/0244429 A1* | 10/2008 | Stading | G06F 16/9038 715/764 |
| 2008/0244687 A1* | 10/2008 | McClain et al. | 726/1 |
| 2008/0256443 A1 | 10/2008 | Li et al. | |
| 2008/0263009 A1* | 10/2008 | Buettner | G06F 16/90335 707/999.003 |
| 2008/0279534 A1* | 11/2008 | Buttars | H04L 63/061 386/252 |
| 2008/0301228 A1* | 12/2008 | Flavin | G06Q 10/10 709/204 |
| 2008/0306954 A1* | 12/2008 | Hornqvist | G06F 21/6218 707/999.009 |
| 2009/0006427 A1* | 1/2009 | Veeraraghavan | G06Q 10/00 707/999.005 |
| 2009/0063416 A1* | 3/2009 | Faus | G06F 16/951 707/999.003 |
| 2009/0063540 A1* | 3/2009 | Mattox | G06F 16/40 707/999.102 |
| 2010/0023491 A1* | 1/2010 | Huang | H04L 41/28 707/E17.014 |
| 2012/0117612 A1* | 5/2012 | Grinstein | G06F 21/629 726/1 |
| 2012/0239454 A1* | 9/2012 | Taix | G06Q 10/00 705/7.26 |

OTHER PUBLICATIONS

Final Office Action for U.S. Appl. No. 11/849,233 dated Jan. 5, 2011.

(56) References Cited

OTHER PUBLICATIONS

Non-Final Office Action for U.S. Appl. No. 11/849,233 dated Jun. 23, 2011.
Final Office Action for U.S. Appl. No. 11/849,233 dated Dec. 9, 2011.
Non-Final Office Action for U.S. Appl. No. 11/849,233 dated Mar. 26, 2012.
Advisory Action for U.S. Appl. No. 11/849,233 dated Mar. 23, 2011.
Advisory Action for U.S. Appl. No. 11/849,233 dated Feb. 16, 2012.
Final Office Action for U.S. Appl. No. 11/849,233 dated Nov. 21, 2012.
Non-Final Office Action for U.S. Appl. No. 11/849,233 dated Mar. 13, 2013.
Final Office Action for U.S. Appl. No. 11/849,233 dated Aug. 12, 2013.
Advisory Action for U.S. Appl. No. 11/849,233 dated Jan. 28, 2013.
Advisory Action for U.S. Appl. No. 11/849,233 dated Oct. 18, 2013.
Office Action for U.S. Appl. No. 11/849,233 dated Feb. 28, 2014.
Office Action for U.S. Appl. No. 11/849,233 dated Jun. 18, 2014.
Office Action for U.S. Appl. No. 11/849,233 dated Oct. 6, 2014.
Advisory Action for U.S. Appl. No. 11/849,233 dated Sep. 8, 2014.

\* cited by examiner

ATTACHING OWNERSHIP TO DATA

FIELD

This invention relates generally to data classification systems, more particularly, to methods and systems for assigning ownership to data.

DESCRIPTION OF THE RELATED ART

The amount of data available to information seekers has grown astronomically, whether as the result of the proliferation of information sources on the Internet, or as a result of private efforts to organize business information within a company, or any of a variety of other causes. As the amount of available data grows, so does the need to be able to categorize or label that data so that the data may be more efficiently searched and a user may determine the relevance of data to them. One approach is to use metadata to identify and classify a data object.

Metadata is information about the data object such as descriptive attributes of the data object. The metadata can include information such as title of the data object, type of data object, author of the data object, date created, and the like. As used herein, a data object may be any type of instance data (e.g., an electronic mail ("email") message, email message thread, a website, a text file, an image or a Word document). Data object may also be any type of abstract concept such as an event, project, category, and the like. Operating systems, search mechanisms, and filtering mechanisms may utilize metadata to identify, organize, sort or filter data objects.

However, the metadata does not truly identify every person responsible for the stewardship and monitoring of the data object. Typically, the metadata may only identify the creator or modifier of the data object. As such, all persons associated with or interested in the data object must monitor the data object to ensure the data object is properly handled. Accordingly, there is a need in the art for a mechanism to allow users to classify ownership of data objects.

BRIEF DESCRIPTION OF THE DRAWINGS

Various features of the embodiments can be more fully appreciated, as the same become better understood with reference to the following detailed description of an embodiment when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Business enterprises have developed systems for classifying projects and tasks based on peoples relationship to the project or task. Business organizations utilize a RACI model to describe the roles and responsibilities of various teams or people involved in delivering a project or task. It is especially useful in clarifying roles and responsibilities in cross-functional/departmental projects and initiatives. RACI is an acronym for the ownership roles in the RACI model. The RACI model typically includes four ownership roles: responsible—persons who perform work to achieve the project; accountable—persons ultimately accountable for the completion of the project; consulted—persons whose opinions are sought; informed—persons who are kept up-to-date on progress.

Embodiments relate generally to systems and methods for applying ownership to a data object. More particularly, an ownership classification module can include a RACI engine. The RACI engine can be configured to apply RACI ownership roles to data objects. The data objects can include any type of data (e.g., an email, email thread, forum, a website, a text file, an image or a Word document), each data type having a respective application (browser, electronic mail, spreadsheet, content repository, etc.) The data object can also include abstract concepts such as events, projects, dates, places, and the like.

While a user has a data object opened in an application, a user can activate a menu icon within the application to activate the ownership classification module. The ownership classification module can display a graphical user interface, e.g., a dialog box, for the user to apply RACI ownership roles to the data object. The RACI engine can receive RACI ownership roles for the data object from the user. The RACI ownership roles can include an association of different users with the levels of the RACI model, i.e., at least one user responsible for the data object; at least one user accountable for the data object; at least one user consulted about the data object; and at least one user informed about the data object.

After the user completes associating ownership to the data object, the ownership classification module can save the RACI ownership roles as metadata for the data object. Additionally, the RACI engine can store the RACI roles associated with an identification of the data object or a link to the data object in a repository, database or similar device. Also, the RACI engine can notify different users associated with a RACI roles about events with the data object.

The ownership classification module can also comprise a search engine. A user can use the search engine to formulate a query with information such as a user's name or data object. The search engine can then return a list of data objects associated with the user's name and the RACI roles for a data object. The search engine can also return a link to the found data object.

Figure 1:
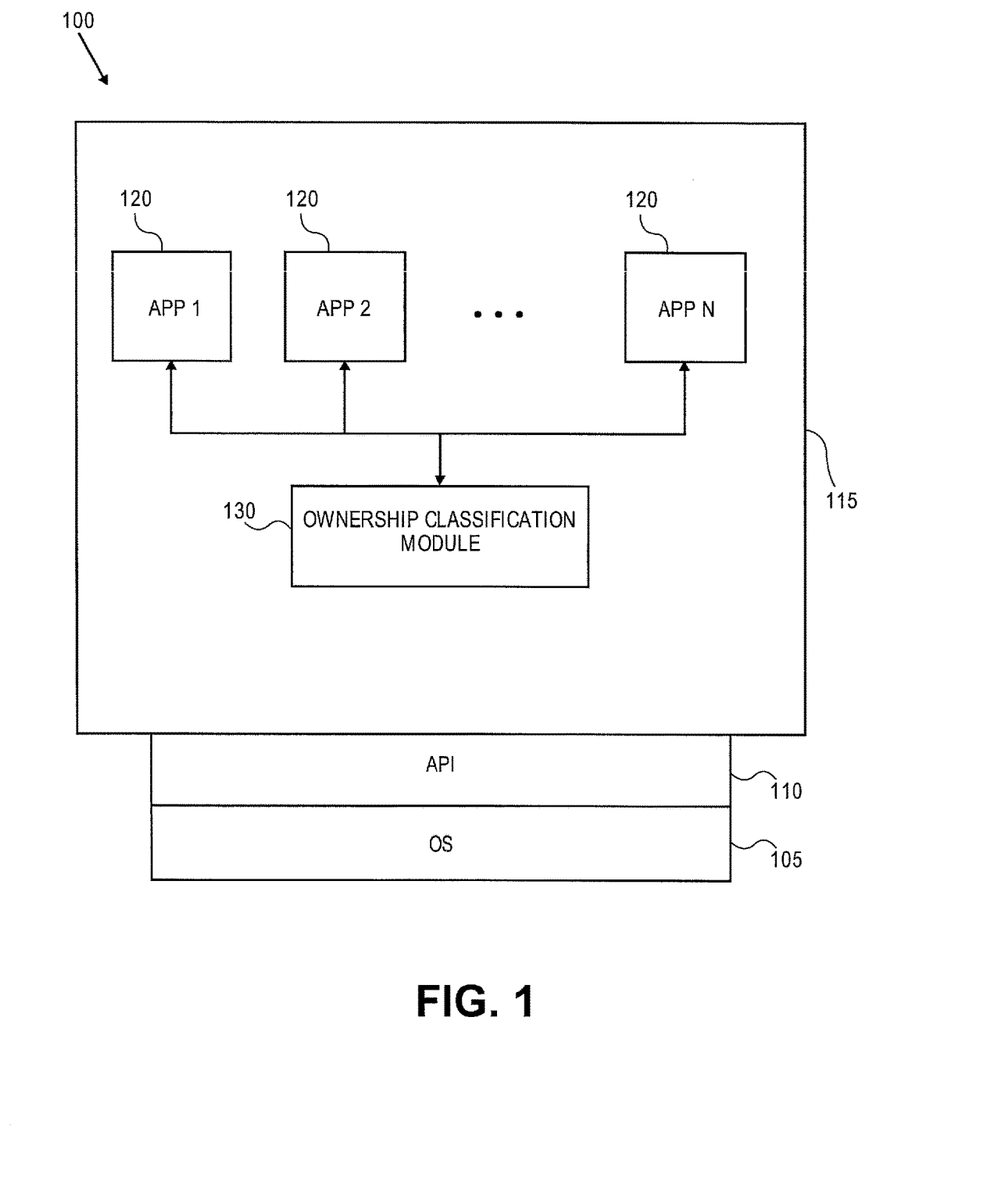
FIG. 1 illustrates an exemplary software environment in accordance with an embodiment.

FIG. 1 illustrates an exemplary software environment 100 in accordance with an embodiment. It should be readily apparent to those of ordinary skill in the art that software environment 100 depicted in FIG. 1 represents a generalized schematic illustration and that other components may be added or existing components may be removed or modified.

As shown in FIG. 1, software environment 100 can include an operating system 105. Operating system 105 can be a version of a Linux™, UNIX™, Windows™, or similar multi-tasking, multi-user operating system. A run-time environment (not shown) can be configured to execute on operating system 105. The run-time environment may provide a set of software that supports the execution of applications/programs. The run-time environment can also comprise an application program interface ("API") 110 and a complementary API (not shown) within an application space 115. API 110 can be configured to provide a set of routines that application space 115 uses to request lower-level services performed by operating system 105. Operating system 105 can include a kernel (not shown). The kernel can be configured to provide secure access to the underlying hardware of a processor.

Application space 115 can represent the space where a user can execute applications given the allotted memory space as determined by a system administrators of software environment 100. Within application space 115, a user can open and execute a number of applications 120. Applications 120 that can be executed within application space 115 can be a wide variety from databases, electronic mail, customer relationship management programs, utilities, browsers, multi-media application, word processing applications, spreadsheet applications, etc. Each of applications 120 has data objects, such as a native file and/or document format, that is associated with the respective application. For example, Microsoft Word™ has default document format, a Word document. Similarly, Adobe™ has a default document type, "pdf" file, as another example.

Software environment 100 can further include a ownership module 130. Ownership classification module 130 can be configured to include a RACI engine (not shown). The RACI engine can be configured to apply RACI ownership roles to data objects. The data objects can include any type of data (e.g., an email, email thread, a website, a text file, an image or a Word document), each data type having a respective application (browser, electronic mail, spreadsheet, content repository, etc.) The data object can also include abstract concepts such as events, projects, dates, places, and the like.

While a user has a data object opened in an application, a user can activate a menu icon or equivalent action, such as keyboard action, macros, etc., within the application to activate ownership classification module 130. Ownership classification module 130 can display a graphical user interface, e.g., a dialog box, for the user to apply RACI ownership roles to the data object. The RACI engine can receive RACI ownership roles for the data object from the user. The RACI ownership roles can include an association of different users with the levels of the RACI model, i.e., at least one user responsible for the data object; at least one user accountable for the data object; at least one user consulted about the data object; and at least one user informed about the data object.

After the user completes associating ownership to the data object, ownership classification module 130 can save the RACI ownership roles as metadata for the data object. Additionally, the RACI engine can store the RACI roles for the respective data object in a repository, database or similar device. Also, the RACI engine can notify different users associated with a RACI roles about events with the data object.

Ownership classification module 130 can also comprise a search engine (not shown). A user can use the search engine to formulate a query with information such as a user's name or data object. The search engine can then return a list of data objects associated with the user's name and the RACI roles for a data object. The search engine can also return a link to the found data object.

Figure 2:
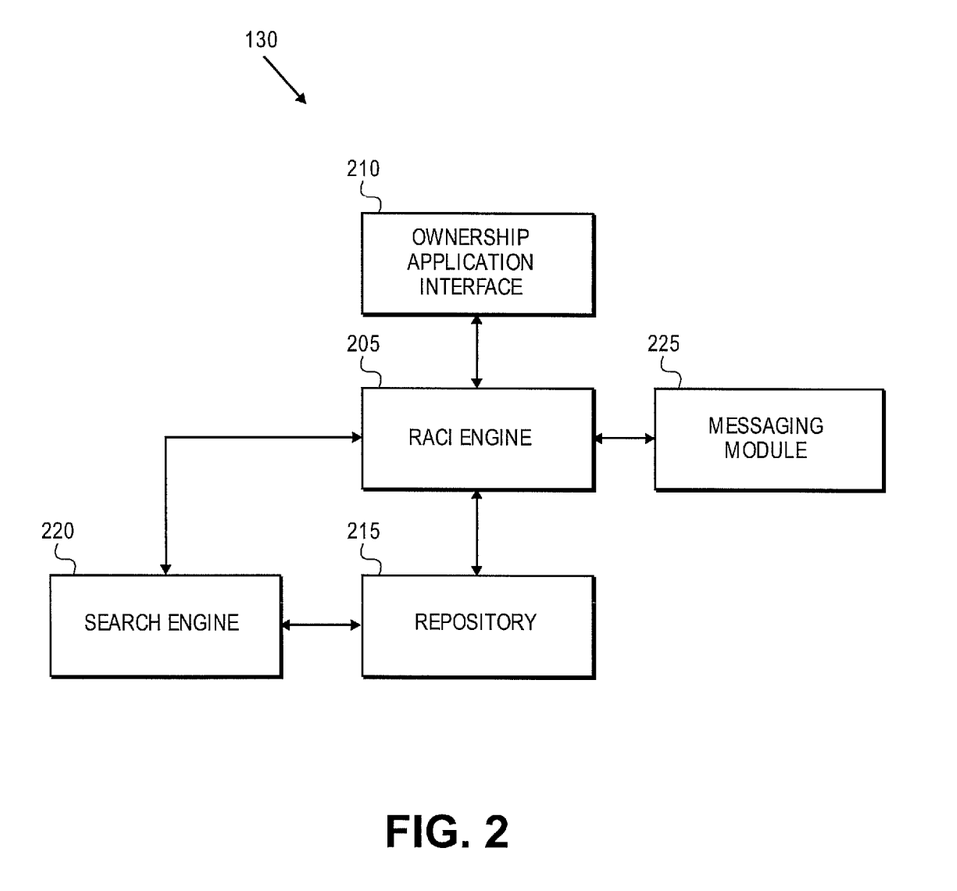
FIG. 2 illustrates an exemplary ownership module in accordance with another embodiment.

FIG. 2 depicts a more detailed block diagram 200 of ownership classification module 130 in accordance with another embodiment. It should be readily apparent to those of ordinary skill in the art that the diagram depicted in FIG. 2 represents a generalized schematic illustration and that other components may be added or existing components may be removed or modified.

As shown in FIG. 2, ownership classification module 130 can comprise a RACI engine 205, a ownership interface 210, a repository 215, a search engine 220, and a messaging module 225. Modules 205-225 of ownership classification module 130 can be implemented as software components, hardware components or combinations thereof. More particularly, modules 205-225 can be implemented using conventional programming languages (e.g., Pascal, FORTRAN, etc.), objected oriented programming languages (e.g., C++), Java, PHP, Perl, or other similar languages. Modules 205-225 can also be implemented as hardware components such as an application specific integrated circuit, a programmable read-only memory, an EEPROM, a microcontroller, a microprocessor or other similar computing platform.

RACI engine 205 can be configured to manage modules 210-225 to provide the functionality of ownership classification module 130 as previously described and further described herein below. RACI engine 205 can be configured, among other things, to receive ownership roles to be applied to a data object from a user and to associate the ownership roles with data object. RACI engine 205 can be configured to store the ownership roles as metadata with the data object. RACI engine 205 can also be configured to store ownership roles associated with the data object in the repository 215.

In particular, RACI engine 205 can be configured to receive and apply information for the four levels of ownership in the RACI model: responsible, accountable, consulted, and informed. The information for each ownership role can include a user or users assigned to the particular level in the RACI model.

Figure 3:
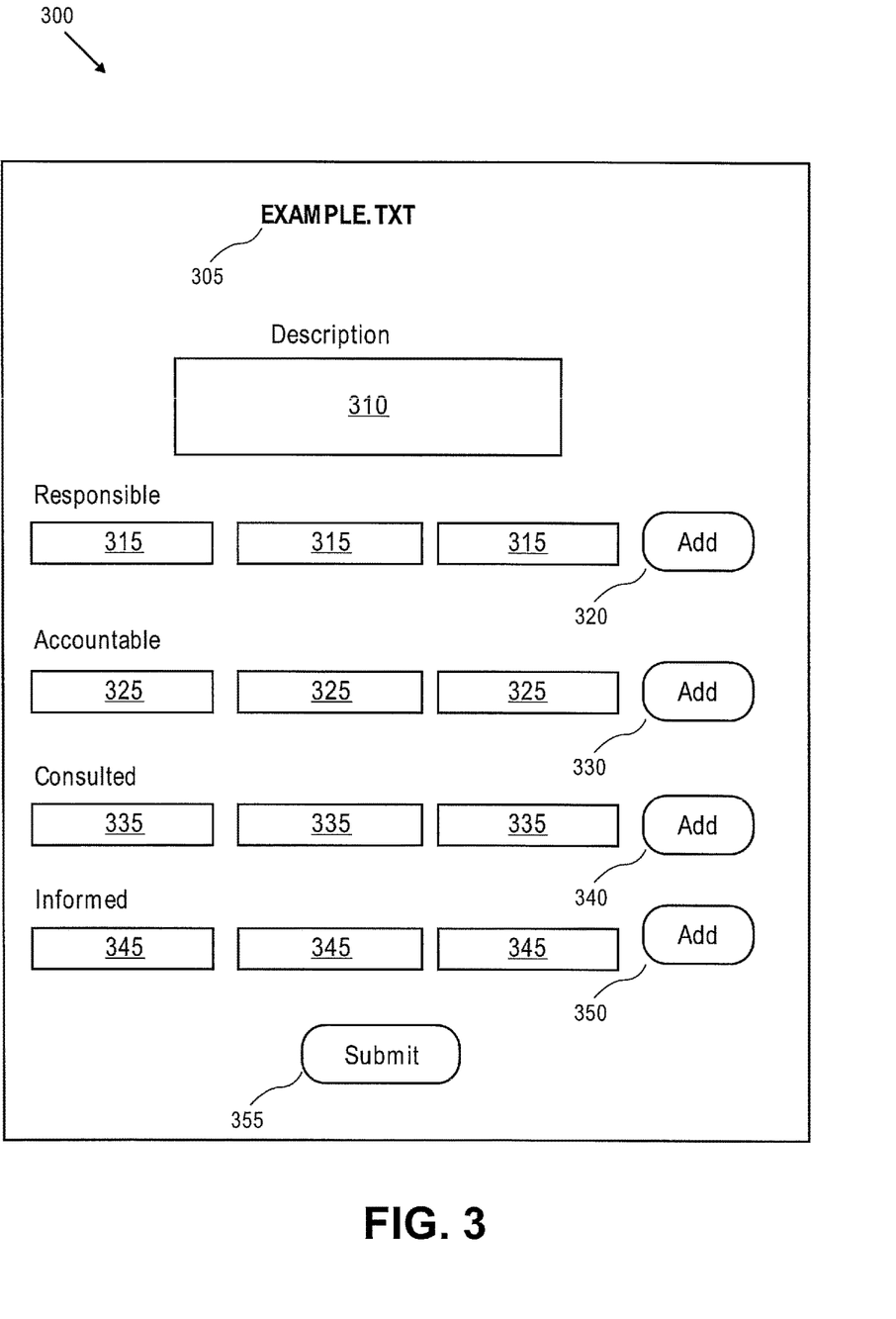
FIG. 3 illustrates an exemplary interface in accordance with yet another embodiment.

To receive ownership roles, RACI engine 205 can be configured to generate graphical user interfaces (GUIs) and/or graphical widgets for a user to interface with ownership classification module 130, as shown in FIG. 3. In some embodiments, ownership classification module 130 can include a user interface module to generate the appropriate graphical user interfaces.

FIG. 3 is a diagram illustrating an exemplary GUI 300 for entering ownership roles in accordance with embodiments. It should be readily apparent to those of ordinary skill in the art that the diagram depicted in FIG. 3 represents a generalized schematic illustration and that other components may be added or existing components may be removed or modified.

As illustrated, GUI 300 can include an identification text field 305, description text field 310, responsible text fields 315, add additional responsible widget 320, accountable text fields 325, add additional accountable widget 330, consulted text fields 335, add additional consulted widget 340, informed text fields 345, add informed widget 350, and submit widget 355.

Identification text field 305 can display static text language that identifies the data object, such as file name. Description text field 310 is an editable text field that allows the user to enter a description of the data object or comments on the data object. Responsible text fields 315, accountable text fields 325, consulted text fields 335, and informed text fields 345 are editable text field that allow the user to associate users with the ownership roles.

If the user needs to enter more users than text fields displayed, the user may activate add additional responsible widget 320, add additional accountable widget 330, add additional consulted widget 340, or add informed widget 350 to display additional editable text fields. Once the user has entered all the information, the user can activate the submit widget 355 to transfer the information of GUI 300 to RACI engine 205.

Figure 4:
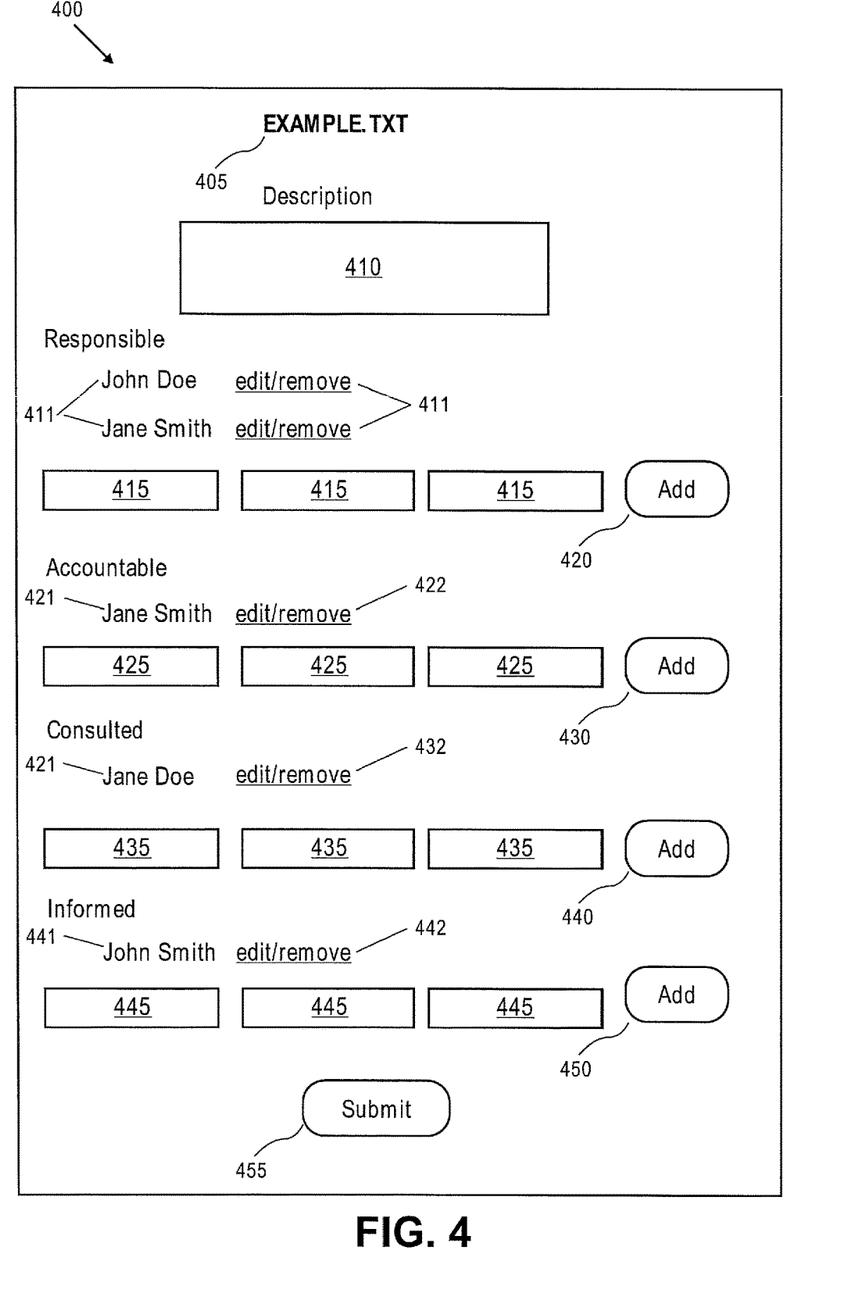
FIG. 4 illustrates an exemplary interface in accordance with yet another embodiment.

Returning to FIG. 2, if ownership roles already exist for a data object, RACI engine 205 can generate a GUI for a user to update ownership roles for a data object, as illustrated in FIG. 4. In some embodiments, ownership classification module 130 can include a user interface module to generate the appropriate graphical user interfaces.

FIG. 4 is a diagram illustrating an exemplary GUI 400 for updating ownership roles in accordance with embodiments. It should be readily apparent to those of ordinary skill in the art that the diagram depicted in FIG. 4 represents a generalized schematic illustration and that other components may be added or existing components may be removed or modified.

As illustrated, GUI 400 can include an identification text field 405, description text field 410, existing responsible text fields 411, edit existing responsible widget 412, responsible text fields 415, add additional responsible widget 420, existing accountable text field 421, edit existing accountable widget 422, accountable text fields 425, add additional accountable widget 430, existing consulted text field 431, edit existing consulted widget 432, consulted text fields 435, add additional consulted widget 440, existing informed text field 441, edit existing informed widget 442, informed text fields 445, add informed widget 450, and submit widget 455.

Identification text field 405 can display static text language that identifies the data object, such as file name. Description text field 410 is an editable text field that allows the user to enter a description of the data object or comments on the data object and may include previously entered description.

Existing responsible text fields 411, existing accountable text field 421, existing consulted text field 431, and existing informed text field 441 are text fields that display previously entered users for their respective roles. To edit or remove the existing ownership roles, the user may activate edit existing responsible widget 412, edit existing accountable widget 422, edit existing consulted widget 432, and edit existing informed widget 442 to edit the respective existing ownership role.

Responsible text fields 415, accountable text fields 425, consulted text fields 435, and informed text fields 445 are editable text field that allow the user to add additional users with the ownership roles. If the user needs to enter more users than text fields displayed, the user may activate add additional responsible widget 420, add additional accountable widget 430, add additional consulted widget 440, or add informed widget 450 to display additional editable text fields. Once the user has entered all the information, the user can activate the submit widget 455 to transfer the information of GUI 400 to RACI engine 205.

Returning to FIG. 2, RACI engine 205 can be configured to authenticate the user adding or update ownership roles. RACI engine 205 can utilize well-known authentication and cryptographic methods to authenticate, such as user name and passwords. If ownership roles already exist for a data object, RACI engine 205 can authenticate a user based on the ownership roles. For example, RACI engine 205 can allow users classified as responsible or accountable to modify ownership roles.

RACI engine 205 can be coupled to ownership application interface 210. Ownership application interface 210 can be configured to provide an interface to applications 120. More particularly, a menu icon that is linked to ownership application interface 210 can be configured to be installed with applications 120. In some instances, applications 120 can be open source applications, which allow these configuration/installation modifications. If applications 120 are proprietary applications, i.e., not open source, applications 120 can permit the same configuration/installation modification depending on their published application program interfaces. When the menu icon is activated, ownership application interface 210 can receive the name of the activating application as well as a link to the data object that is opened in the activating application.

RACI engine 205 can be further coupled to repository 215. Repository 215 can be configured to store ownership roles created by RACI engine 205 and to provide a searchable data structure to retrieve previously stored ownership roles. For example, the data structure can comprise a unique identifier of the data object, the application associated with the data object, a link to the data object, and the applied ownership roles of the data object. Repository 215 can be implemented as a database using open source technologies, proprietary technologies, or combinations thereof.

Ownership classification module 130 can include a search engine 220. Search engine 220 can be an independent module 220 or be part of repository 215 in some embodiments. Search engine 220 can be configured to receive a query from a user that includes search topics such as data objects, ownership roles, application types, and the like. Search engine 220 can then be configured to search repository 215 for entries which may include the search topics.

Search engine 220 can then compile a list of matching entries and temporarily buffer the list of matching entries. Subsequently, search engine 220 can extract the entries that can include the identification of the data object, link to the data object, ownership roles applied to the data object, etc. Search engine 220 can display the list of matching entries. A user can review the list and activate the link to bring up the data object in its native application. In some embodiments, the user can preview the data object by placing a mouse over the respective entry and bring up a thumbnail image of the data object or ownership roles of the data object.

Ownership module 130 can include a messaging module 225. Messaging module 225 can be configured to notify the users assigned in ownership roles of data object that an event has occurred with the data object. Messaging module 225 can notify the users based on their assigned role in the RACI model. For example, if the data object is a web page, message module 225 can notify users classified as responsible and accountable that a web page has been updated.

Figure 5:
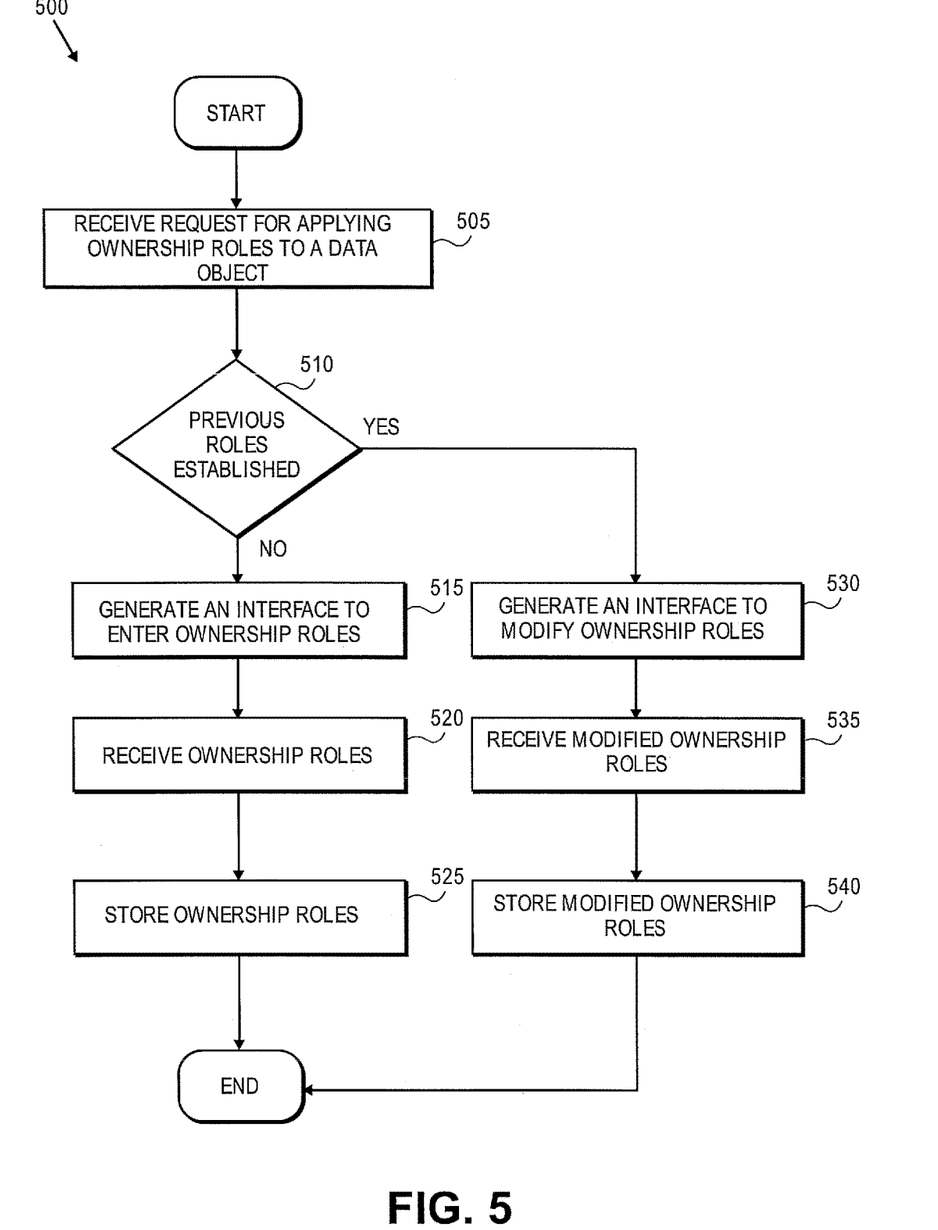
FIG. 5 illustrates an exemplary process flow of an ownership module in accordance with another embodiment.

FIG. 5 depicts an exemplary ownership classification flow diagram 500 implemented by RACI engine 205 in accordance with another embodiment. It should be readily apparent to those of ordinary skill in the art that the flow diagram 500 depicted in FIG. 5 represents a generalized schematic illustration and that other steps may be added or existing steps may be removed or modified.

As shown in FIG. 5, RACI engine 205 can be configured to receive a request to apply ownership roles with a data object, in step 505. More specifically, RACI engine 205 can be invoked when a user activates a menu icon within a respective application of the data object. The activation of the menu icon can also forward the name of the respective application as well as identification of the data object and any ownership roles previously stored with the data object to RACI engine 205 through ownership application interface 210. The name of the respective application, identification of the data object, and previously stored ownership roles can be temporarily buffered by RACI engine 205.

Optionally, RACI engine 205 can be configured to authenticate the user adding or update ownership roles. RACI engine 205 can utilize well-known authentication and cryptographic methods to authenticate, such as user name and passwords. If ownership roles already exist for a data object, RACI engine 205 can authenticate a user based on the ownership roles. For example, RACI engine 205 can allow users classified as responsible or accountable to modify ownership roles.

Then, RACI engine 205 can determine if ownership roles have been previously established, in step 510. RACI engine 205 can determine if previously established ownership roles exist by checking for ownership roles received during the request. Additionally, RACI engine 205 can utilize search engine 220 to search repository 215 for previously applied ownership roles for the data object.

If no previous ownership information exists, RACI engine 205 can also generate a graphical user interface to receive new ownership rules from the user, in step 515. For example, RACI engine 205 can be configured to generate a GUI, such as a dialog box, that contains four text entry fields for a user to associate user with roles of the RACI model, i.e., at least one user responsible for the data object; at least one user accountable for the data object; at least one user consulted about the data object; and at least one user informed about the data object.

In step 520, RACI engine 205 receives the ownership roles from the user. RACI engine 205 can receive the ownership roles via ownership application interface 210. The user may transmit the ownership roles by activating a submit widget on the GUI.

Then, in step 525, RACI engine 205 stores the ownership roles. RACI engine 205 can store the ownership roles by transmitting the ownership roles to the respective application for storage with the data object. Additionally, RACI engine 205 can store the ownership roles in repository 215.

If previous ownership information is determined to exist at step 510, RACI engine 205 can also generate a graphical user interface to receive modified ownership rules from the user, in step 530. For example, RACI engine 205 can be configured to generate a GUI, such as a dialog box, that contains the previously applied ownership roles and four text entry fields for a user to modify users associated with the roles of the RACI model, i.e., at least one user responsible for the data object; at least one user accountable for the data object; at least one user consulted about the data object; and at least one user informed about the data object.

In step 535, RACI engine 205 receives the modified ownership roles from the user. RACI engine 205 can receive the ownership roles via ownership application interface 210. The user may transmit the ownership roles by activating a submit widget on the GUI.

Then, in step 540, RACI engine 205 stores the modified ownership roles. RACI engine 205 can store the ownership roles by transmitting the modified ownership roles to the respective application for storage with the data object. Additionally, RACI engine 205 can store the modified ownership roles in repository 215.

Figure 6:
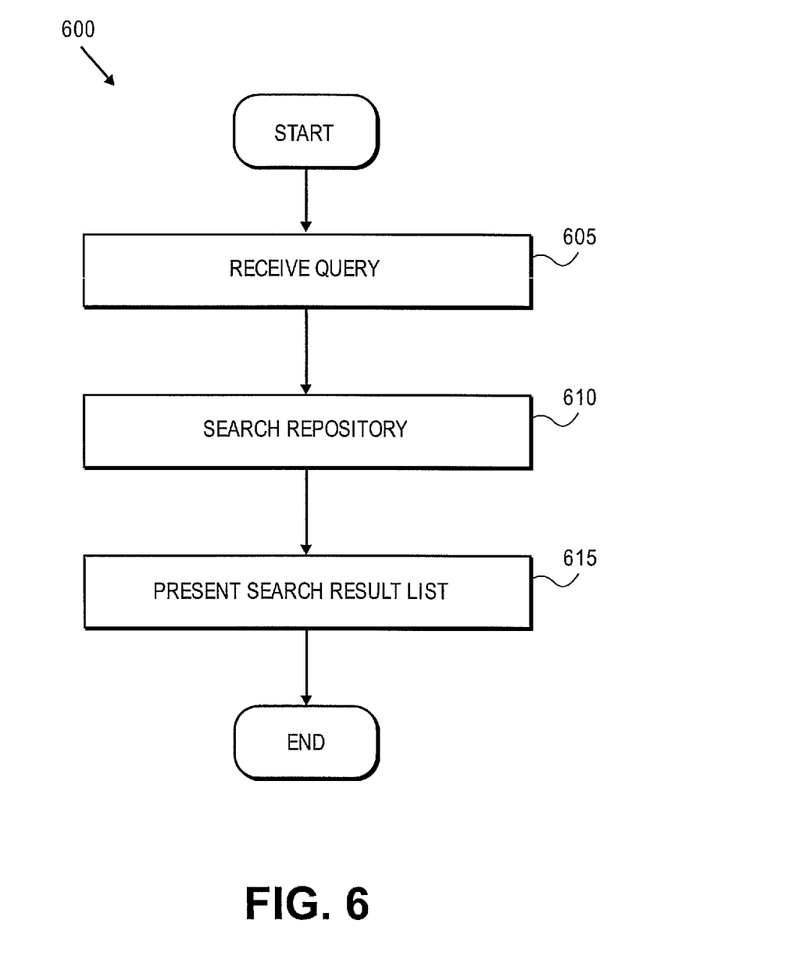
FIG. 6 illustrates another exemplary process flow of an ownership module in accordance with another embodiment.

FIG. 6 depicts an exemplary ownership classification flow diagram 600 implemented by the search engine 220 in accordance with another embodiment. It should be readily apparent to those of ordinary skill in the art that the flow diagram 600 depicted in FIG. 6 represents a generalized schematic illustration and that other steps may be added or existing steps may be removed or modified.

As shown in FIG. 6, search engine 220 can be configured to receive a query from a user in step 605. More specifically, a user can access search engine 220 of ownership classification module 130 by activating a menu option, command prompt, icon, etc. Search engine 220 can then display a query GUI for a user to enter search topics to search for data objects or ownership roles. The search topics can include data objects, ownership roles, application types, and the like. The query GUI can have a text entry field for users to enter the search topics. In some embodiments, boolean logic can be included in the query GUI to allow for a more focused search with additional search terms. The user can forward the inputted search topics to search engine 220 in response to an activation of a submit widget on the query GUI. Subsequently, search engine 220 can temporarily buffer the query with the search topics.

In step 610, search engine 220 can be configured to search repository 215 with the query. The search engine 220 can be configured to temporarily buffer matching entries in repository 215.

In step 615, search engine 220 can then be configured to present the search result list to the user. More specifically, search engine 220 can extract the name of the data object, ownership roles, application for the data object, and a link to the data object to generate the results list. Search engine 220 can display the list of matching data objects, including ownership roles, application for the data object, and the link to the data object. A user can review the list and activate the link to bring up the data object in its native application. In some embodiments, the user can preview the data object by placing a mouse over the respective entry and bring up a thumbnail image of the data object.

Figure 7:
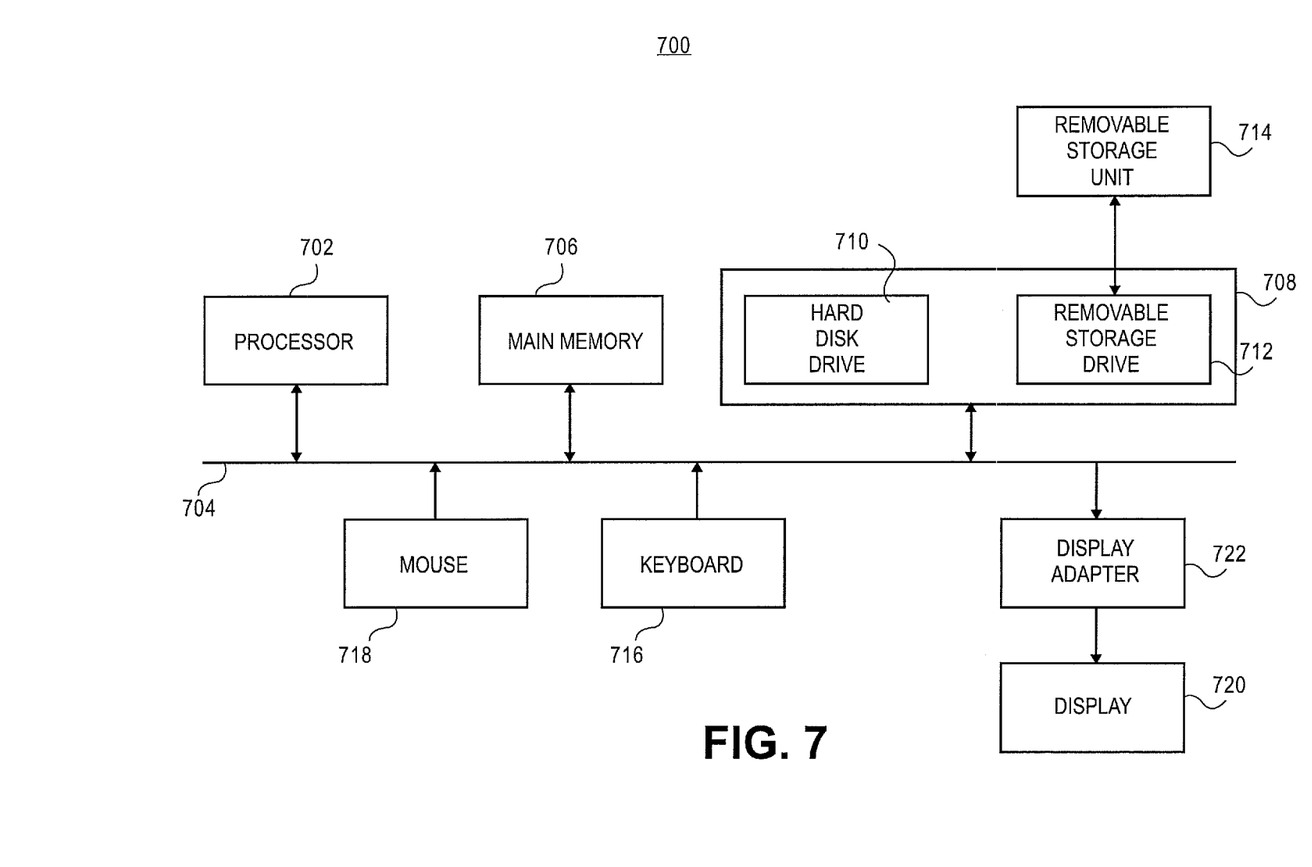
FIG. 7 illustrates an exemplary computer platform in accordance with another embodiment.

FIG. 7 illustrates an exemplary block diagram of a computing platform 700 where an embodiment may be practiced. The functions of the ownership classification module 130 can be implemented in program code and executed by computing platform 700. Ownership classification module 130 may be implemented in computer languages such as PASCAL, C, C++, JAVA, etc.

As shown in FIG. 7, computing platform 700 includes one or more processors, such as processor 702 that provide an execution platform for embodiments of ownership classification module 130. Commands and data from processor 702 are communicated over a communication bus 704. Computing platform 700 also includes a main memory 706, such as a Random Access Memory (RAM), where ownership classification module 130 can be executed during runtime, and a secondary memory 708. Secondary memory 708 includes, for example, a hard disk drive 710 and/or a removable storage drive 712, representing a floppy diskette drive, a magnetic tape drive, a compact disk drive, etc., where a copy of a computer program embodiment for ownership classification module 130 can be stored. Removable storage drive 712 reads from and/or writes to a removable storage unit 714 in a well-known manner. A user interfaces with the ownership classification module 130 with a keyboard 716, a mouse 718, and a display 720. Display adapter 722 interfaces with the communication bus 704 and display 720. Display adapter 722 also receives display data from processor 702 and converts the display data into display commands for display 720.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
presenting, by a processor, a menu icon installed within an application, wherein a first data object is open within the application;
storing, in response to activation of the menu icon by a first user assigned to a first role associated with the first data object, an identification of the application and a first link to the first data object open in the application;
generating, in response to the activation of the menu icon, a plurality of fields corresponding to an assignment of a first plurality of users to ownership roles associated with the first data object, the plurality of fields comprising a responsible role field, an accountable role field, a consulted role field, and an informed role field;
receiving via at least one of the plurality of fields, from the first user, first information modifying an assignment of at least a portion of the first plurality of users to a different ownership role for the first data object;
authenticating, in view of one of a username and password associated with the first user or the first user being assigned to the first role for the first data object, the first user to confirm the first user has permission to modify the assignments;
generating, in response to the authenticating, first metadata comprising information identifying the first plurality of users assigned to the plurality of ownership roles for the first data object;
storing, in response to activation of the menu icon, an identification of the application and a second link to a second data object open in the application;
generating, in response to the activation of the menu icon, a plurality of fields to receive information assigning a second plurality of users to the different types of ownership roles for the second data object;
generating, by the processor, second metadata comprising information identifying the second plurality of users assigned to the plurality of ownership roles for the second data object;
storing the first metadata with the first data object in a repository;
storing the second metadata with the second data object in the repository;
monitoring, by the processor, the first data object to determine an occurrence of an update of the first data object;
searching, by the processor, the repository in view of the update to identify the first metadata comprising the information identifying the first plurality of users assigned to the ownership roles for the first data object;
generating a search result list identifying the first plurality of users and corresponding ownership roles; and
transmitting a notification to a first portion of the first plurality of users of the occurrence of the update associated with the first data object, wherein the notification is transmitted in view of the ownership roles for the first data object assigned to the first portion of the first plurality of users, and wherein a second portion of the first plurality of users do not receive the notification in view of the ownership roles for the first data object.

2. The method of claim 1, further comprising:
receiving an instruction to activate a search engine menu option; and
receiving, by a query graphical user interface, the search topic further comprising at least one of a data object, ownership role or an application type.

3. The method of claim 1, wherein the search result list comprises the first link to the first data object.

4. A system comprising:
a memory to store instructions; and
a processor operatively coupled to the memory, the processor to execute the instructions to:
present a menu icon installed within an application, wherein a first data object is open within the application;
store, in response to activation of the menu icon by a first user assigned to a first role associated with the first data object, an identification of the application and a first link to the first data object open in the application;
generate, in response to the activation of the menu icon, a plurality of fields corresponding to an assignment of a first plurality of users to ownership roles associated with the first data object, the plurality of fields comprising a responsible role field, an accountable role field, a consulted role field, and an informed role field;

receive, via at least one of the plurality of fields, from the first user, first information modifying an assignment of at least a portion of the first plurality of users to a different ownership role for the first data object;

authenticate, in view of one of a username and password associated with the first user or the first user being assigned to the first role for the first data object, the first user to confirm the first user has permission to modify the assignments;

generate first metadata comprising information identifying the plurality of users assigned to the plurality of ownership roles for the first data object;

store, in response to activation of the menu icon, an identification of the application and a second ink to a second data object open in the application;

generate, in response to the activation of the menu icon, a plurality of fields to receive information assigning a second plurality of users to the different types of ownership roles for the second data object;

generate second metadata comprising information identifying the second plurality of users assigned to the plurality of ownership roles for the second data object store the first metadata with the first data object in a repository;

store the second metadata with the second data object in the repository;

monitor the first data object to determine an occurrence of an update of the first data object;

search the repository in view of the update to identify the first metadata comprising the information identifying the first plurality of users assigned to the ownership roles for the first data object;

generate a search result list identifying the first plurality of users and corresponding ownership roles; and transmit a notification to a first portion of the first plurality of users of the occurrence of the update associated with the first data object, wherein the notification is transmitted in view of the ownership roles for the first data object assigned to the first portion of the first plurality of users, and wherein a second portion of the first plurality of users do not receive the notification in view of the ownership roles for the first data object.

5. The system of claim 4, the processor to:
receive an instruction to activate a search engine menu option; and
display a graphical user interface to receive the search topic comprising at least one of a data object, an ownership role or an application type.

6. The system of claim 5, wherein the search result list comprises the first link to the first data object.

7. A non-transitory computer readable storage medium comprising program instructions that when executed by a processor, cause the processor to:
present a menu icon installed within an application, wherein a first data object is open within the application;

store, in response to activation of the menu icon by a first user assigned to a first role associated with the first data object, an identification of the application and a first link to the first data object open in the application;

generate, in response to the activation of the menu icon, a plurality of fields corresponding to an assignment of a first plurality of users to ownership roles associated with the first data object, the plurality of fields comprising a responsible role field, an accountable role field, a consulted role field, and an informed role field;

receive, via at least one of the plurality of fields, from the first user, first information modifying an assignment of at least a portion of the first plurality of users to a different ownership role for the first data object;

authenticate, in view of one of a username and password associated with the first user or the first user being assigned to the first role for the first data object, the first user to confirm the first user has permission to modify the assignments;

generate first metadata comprising information identifying the plurality of users assigned to the plurality of ownership roles for the first data object;

store, in response to activation of the menu icon, an identification of the application and a second ink to a second data object open in the application;

generate, in response to the activation of the menu icon, a plurality of fields to receive information assigning a second plurality of users to the different types of ownership roles for the second data object;

generate second metadata comprising information identifying the second plurality of users assigned to the plurality of ownership roles for the second data object store the first metadata with the first data object in a repository;

store the second metadata with the second data object in the repository;

monitor the first data object to determine an occurrence of an update of the first data object;

search the repository in view of the update to identify the first metadata comprising the information identifying the first plurality of users assigned to the ownership roles for the first data object;

generate a search result list identifying the first plurality of users and corresponding ownership roles; and transmit a notification to a first portion of the first plurality of users of the occurrence of the update associated with the first data object, wherein the notification is transmitted in view of the ownership roles for the first data object assigned to the first portion of the first plurality of users, and wherein a second portion of the first plurality of users do not receive the notification in view of the ownership roles for the first data object.

8. The non-transitory computer readable storage medium of claim 7, the processor to authenticate a user in view of at least one of an ownership role, a username or a password.

* * * * *